United States Patent [19]
Hiramatsu

[11] Patent Number: 5,161,132
[45] Date of Patent: Nov. 3, 1992

[54] MAGNETO-OPTICAL RECORDING APPARATUS INCLUDING A MAGNETIC HEAD OF A PNEUMATIC FLOATING TYPE

[75] Inventor: Makoto Hiramatsu, Yokohama, Japan

[73] Assignee: Canon Kabushiki Kaisha, Tokyo, Japan

[21] Appl. No.: 810,540

[22] Filed: Dec. 19, 1991

Related U.S. Application Data

[63] Continuation of Ser. No. 658,655, Feb. 21, 1991, abandoned.

[30] Foreign Application Priority Data

Feb. 28, 1990 [JP] Japan .................. 2-048175

[51] Int. Cl.$^5$ .............. G11B 13/04; G11B 5/127; G11B 11/10
[52] U.S. Cl. ................... 369/13; 360/114; 360/103; 360/122; 360/125; 360/59
[58] Field of Search ............ 369/13; 360/59, 66, 360/60, 114, 103, 125, 126, 122

[56] References Cited

U.S. PATENT DOCUMENTS

| | | | |
|---|---|---|---|
| 4,618,901 | 10/1986 | Hatakeyama et al. | 360/114 |
| 4,633,450 | 12/1986 | Gueugnon | 360/114 |
| 4,825,428 | 4/1989 | Toki | 369/13 |
| 4,849,952 | 7/1989 | Shiho | 360/114 |
| 4,890,178 | 12/1989 | Ichihara | 369/13 |
| 4,893,207 | 1/1989 | Maury et al. | 360/114 |
| 4,918,556 | 4/1990 | Ezaki | 360/103 |
| 5,020,041 | 5/1991 | Nakao et al. | 369/13 |
| 5,043,833 | 8/1991 | Aikawa et al. | 360/103 |
| 5,051,970 | 9/1991 | Ishii et al. | 369/13 |

FOREIGN PATENT DOCUMENTS 0275747 7/1988 European Pat. Off. .
0278756 8/1988 European Pat. Off. .

Primary Examiner—Hoa Nguyen
Attorney, Agent, or Firm—Fitzpatrick, Cella, Harper & Scinto

[57] ABSTRACT

A magnetic recording apparatus including a magnetic head having a core formed of a magnetic material is disclosed. If the size of a cross section of the core is $A \times B$ ($A \geq B$), the distance d between a core end surface and a recording layer of the recording medium is selected so as to satisfy the relationship:

$$0.1 \times B < d < 0.4 \times A.$$

The magnetic field applied to the recording layer facing the core end surface is thereby made uniform. A method of applying a magnetic field to a magnetic recording carrier using such an apparatus also is disclosed.

7 Claims, 7 Drawing Sheets

MAGNETO-OPTICAL RECORDING APPARATUS INCLUDING A MAGNETIC HEAD OF A PNEUMATIC FLOATING TYPE

This application is a continuation of prior application, Ser. No. 07/658,655 filed Feb. 21, 1991, now abandoned. BACKGROUND OF THE INVENTION 1. Field of the Invention This invention relates to a magnetic recording apparatus and a magnetic recording method using a magnetic head. The present invention is particularly effective when applied to magneto-optical recording apparatuses in which a magnetic field is modulated to record information.

2. Description of the Prior Art

Figure 1:
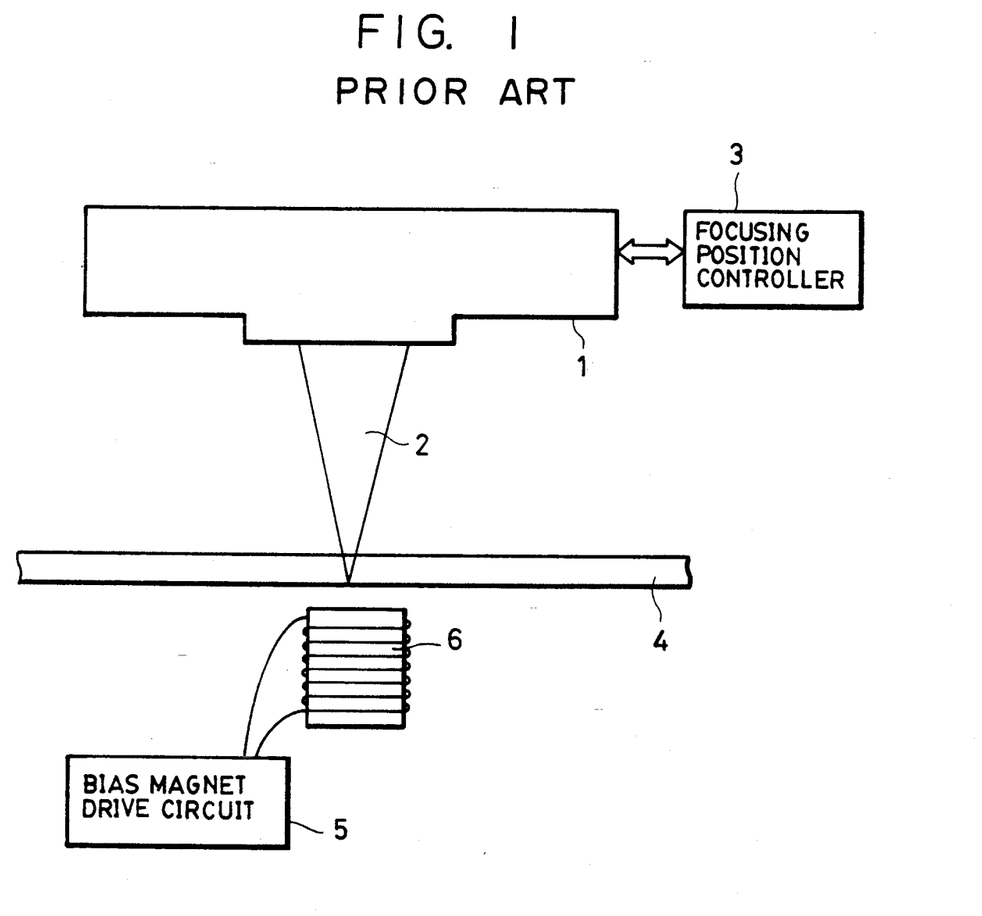
FIG. 1 is a schematic diagram of a conventional magneto-optical recording/reproduction apparatus.

Ordinarily, for writing new data on a magneto-optical recording medium with a magneto-optical recording and/or reproduction apparatus, a process is required in which old data is first erased, new data is then written, and the written data is confirmed. FIG. 1 shows a schematic diagram of a conventional magneto-optical recording/reproduction apparatus. A recording layer of a recording carrier 4 is irradiated with a beam of light 2 supplied from an optical head 1. The optical head 1 is controlled by a focusing position controller so that the light beam 2 is focused on the recording carrier 4. A bias magnet 6 is disposed so as to face the optical head through the recording carrier 4. The bias magnet 6 is driven by a bias magnet driving circuit 5 so that an optimum magnetic field is applied to the recording carrier in each of erasing and recording modes. In this arrangement, at the time of erasing, the bias magnet is driven to apply a magnetic field in one direction, perpendicular to the recording carrier surface, and the recording carrier is continuously irradiated with a light beam which is an erasing output, thereby erasing information. At the time of recording, a magnetic field is applied in the direction opposite to that applied at the time of erasing, and a light beam which is a recording output is modulated in accordance with recording data and is applied to the recording carrier, thereby recording information.

Ordinarily, this type of a magneto-optical recording/reproduction apparatus is arranged to apply a magnetic field over the entire light beam moving region by using one bias magnet, and therefore, has a large size. Also, there is a corresponding problem of an increase in power consumption. Recently, methods of overwriting new data on old data without previously erasing the old data have been adopted. One of the recording steps is thereby removed to increase the recording rate. As one of these new methods, a method of modulating the magnetic field applied to the magneto-optical recording medium to write new information has been proposed. If a coil having a large inductance is used on the magnetic head side to effect such magnetic field modulation recording, high-speed modulation cannot be effected, and the transfer rate is reduced rather than being increased. For this reason, a magnetic head having a small inductance is ordinarily used.

Figure 2:
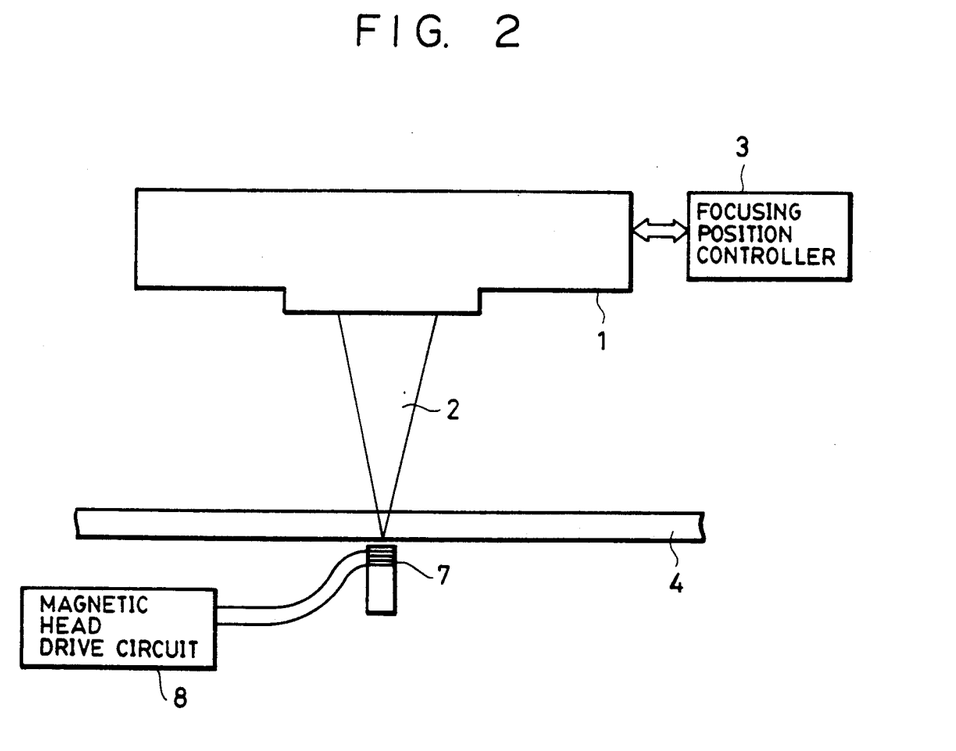
FIG. 2 is a schematic diagram of a magnetic field modulation recording type magneto-optical recording/reproduction apparatus.

FIG. 2 schematically shows a magneto-optical recording/reproduction apparatus based on such a magnetic field modulation recording method.

A magnetic head 7 is disposed so as to face an optical head 1 and is controlled by a magnetic head driving circuit 8. When information is recorded, the magnetic head 7 is driven by the magnetic drive circuit 8 in a modulation driving manner while a light beam which is a recording output is applied from the optical head 1 to a recording carrier 4. The modulated magnetic field is thereby generated and the information is recorded on the recording carrier 4 by this magnetic field.

When a magnetic head having a small inductance is used, there is a need to move the magnetic head closer to the recording medium, because the core formed of a magnetic material is generally small and because the generated magnetic field is accordingly small.

Figure 3A:
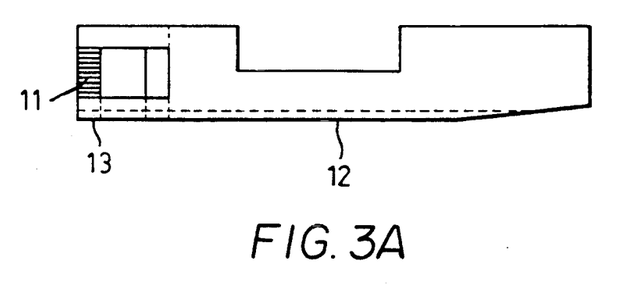
Figure 3B:
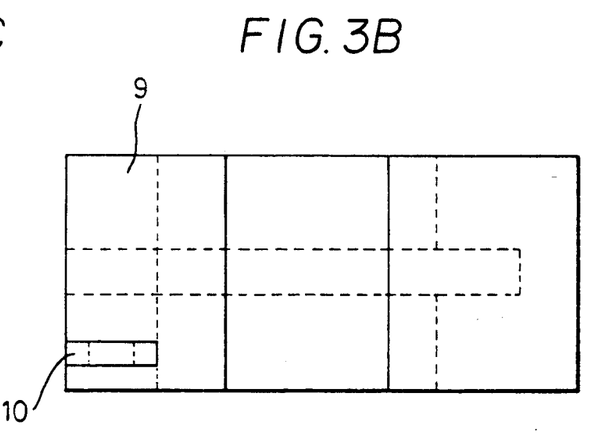
Figure 3C:
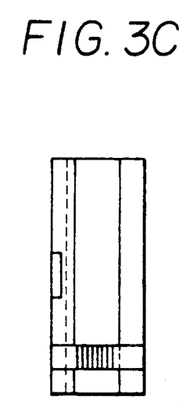

For this reason, a pneumatic floating type magnetic head is ordinarily used as the magnetic head for this kind of use. FIG. 3 shows outlines of a magnetic head of this type. A coil 1 is wound around a core 10 formed of a magnetic material and is embedded in a slider 9. A current modulated in accordance with recording information is caused to flow through the coil 11 to obtain a modulated magnetic field.

The entire slider floats from the recording medium by air flowing along a slider surface 12 and is maintained at a distance of about 0.1 to 2 $\mu$m for the recording medium.

Figure 4:
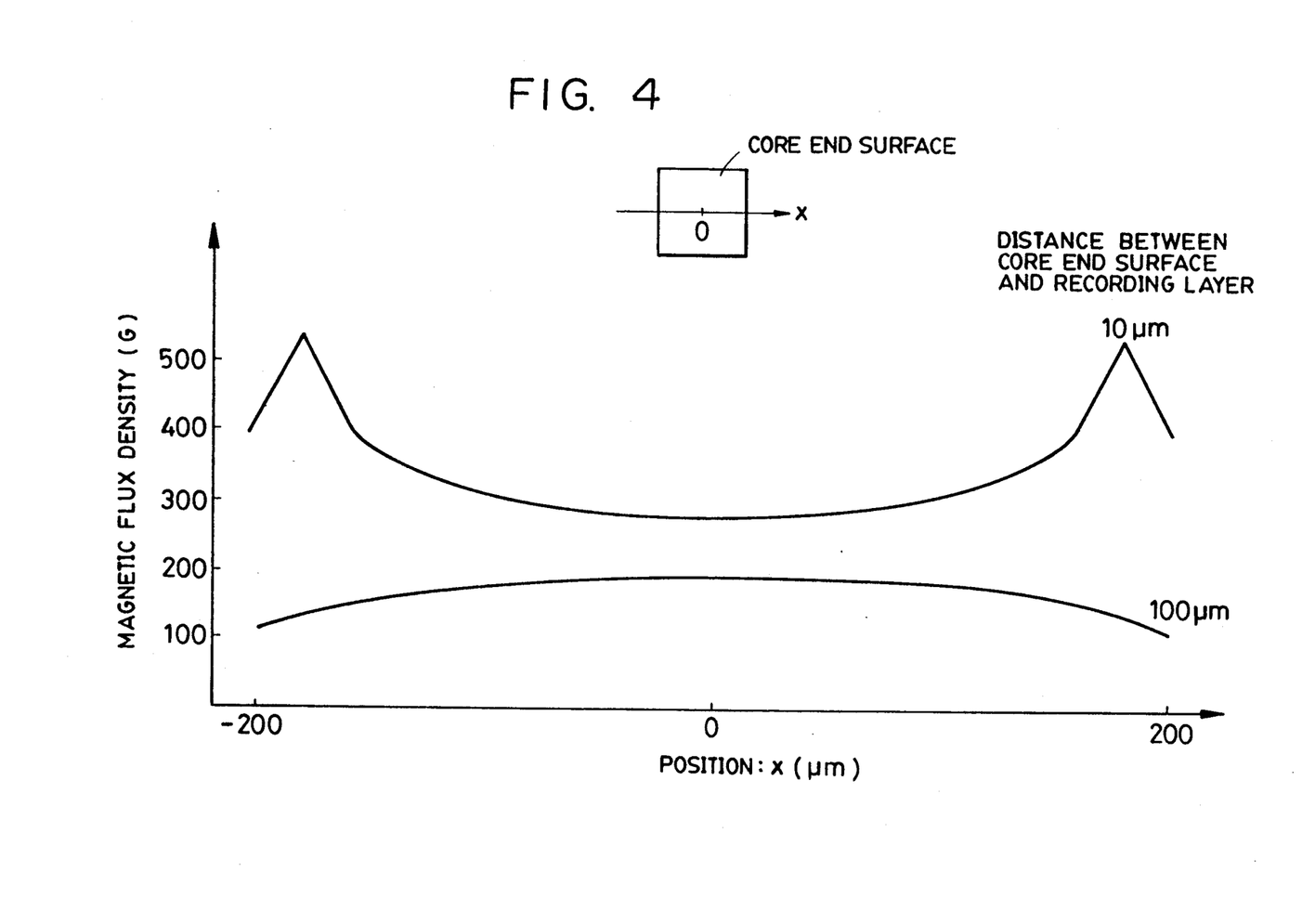
FIG. 4 is a diagram of distributions of a magnetic field applied to the recording layer by the conventional magnetic head.

In the conventional magnetic head, however, a core end surface 13 and the pneumatic floating surface 12 are on the same plane, and the floating distance is small, on the order of 0.1 to 2 $\mu$m, so that the distance between the recording medium and the core end surface is small. The generated magnetic field is therefore non-uniform; it is stronger at each end of the core end surface and is weaker near the center, as shown in FIG. 4. The graph of FIG. 4 shows magnetic field distributions in the vicinity of the core end surface, which were obtained by winding a coil around a core having a cross-sectional shape of 0.2×0.2 mm regular square and by causing a current of 6 AT (ampere turn) to flow through the coil. The ordinate represents the magnetic flux density (unit: Gauss), and the abscissa represents the position (unit: $\mu$m) with respect to the center 0 of the core end surface. As can be read from the graph, when the distance between the core end surface and the recording layer is 10 $\mu$m, the magnetic flux density is 420 G±30% and a non-uniformity of 30% exists.

If such a non-uniformity of the magnetic field exists, information cannot be suitably recorded at a position where the magnetic field is weak, or recorded information may be destroyed at a position where the magnetic field is strong.

If a sliding type magnetic head, used by being slid on the recording carrier, is employed, the above problem is more serious, because the magnetic head is used in close proximity to the recording surface.

If a stationary type head fixed of the apparatus is employed, instead of a pneumatic floating magnetic head, there is a possibility that the distance between the core end surface and the recording layer of the recording carrier is increased due to an error in positioning the recording carrier so that the magnetic field is stronger at the center and is weaker at the ends, as shown in FIG. 4, resulting in a failure to maintain an effective applied magnetic field region.

SUMMARY OF HE INVENTION

To solve the above-described problem of the conventional apparatus, the present invention provides a magnetic recording apparatus including a magnetic recording carrier and a magnetic head for applying a magnetic field to the recording carrier to record information thereon, the magnetic head including a core formed of a magnetic material, wherein fi the size of a cross section of the core is A×B (A≧B), the distanced between a core end surface and a recording player of a recording medium is selected so as to satisfy the relationship:

$$0.1 \times B < d < 0.4 \times A$$

whereby the magnetic field applied to the recording layer facing the core end surface is made uniform.

The recording apparatus of the present invention also can include an optical head or irradiating the recording carrier with a light beam simultaneously with the applied magnetic field to record information on the recording carrier.

The shape of the core section can be circle, an ellipse, a square, a rectangle, or the like.

The present invention also provides an apparatus for applying a magnetic field to a magnetic recording carrier. The apparatus includes a magnetic head for applying the magnetic field to the recording carrier. The magnetic head includes a magnetic field generating core. When the size of a cross section f the magnetic field generating core of the magnetic head is A×B (A≧B), and when the distance between a surface of the core facing the recording carrier and a recording layer of the recording carrier is d, a relationship:

$$0.1 \times B < d < 0.4 \times A$$

is satisfied. The magnetic field applying apparatus also can include an optical head for irradiating the magneto optical recording carrier with a light beam.

The present invention also provides an apparatus for applying a magnetic field to a magnetic recording carrier. The apparatus includes a magnetic head for applying a magnetic field to the recording carrier. The magnetic head includes a core having a surface facing the recording carrier. The core is embedded in the magnetic head. The distance between the core surface and a recording layer of the recording carrier ranges from 35 to 50 μm.

The present invention also provides an apparatus for recording information on a magneto-optical recording carrier. The apparatus includes a magnetic head and an optical head for irradiating the magneto-optical recording carrier with a light beam. The magnetic head applies a magnetic field to the recording carrier simultaneously with the light beam irradiated by the optical head to record information on the recording carrier. The magnetic head includes a core having a surface facing the recording carrier. The core is embedded in the magnetic head. The distance between the core and the surface layer of the recording carrier ranges from 35 to 50 μm.

The present invention also provides a method of applying a magnetic field to a magnetic recording carrier having a recording layer. The method includes the steps of applying a magnetic field to the recording medium by using a magnetic head including a magnetic field generating core having a size of A×B (A<B) in cross section, and satisfying a relationship:

$$0.1 \times B < d < 0.4 \times A$$

where d is the distance between a surface of the core facing the recording carrier and the recording layer of the recording carrier.

The present invention also provides a method of applying a magnetic field to a magnetic recording carrier having a recording layer. The method includes the steps of applying a magnetic field to the recording medium by using a magnetic head including a magnetic field generating core having a size of A×B (A≧B) in cross section, and forming on the recording layer a protective layer having a thickness D defined by the relationship:

$$((0.1 \times B) - d') < D < ((0.4 \times A) - d')$$

where d is the distance between a surface of the core facing the recording carrier and the recording layer of the recording carrier.

BRIEF DESCRIPTION OF THE DRAWINGS

FIGS. 3(A-C) are schematic diagram of a pneumatic floating type magnetic head used with the conventional magnetic field modulation recording type magneto-optical recording/reproduction apparatus;

FIGS. 5(A-C) are a schematic diagram of a pneumatic floating type magnetic head in accordance with the present invention;

FIGS. 6(A-C) are a diagrams of the shape of a core embedded in the magnetic head shown in FIG. 5;

DESCRIPTION OF THE PREFERRED EMBODIMENTS

A magneto-optical recording/reproduction apparatus in accordance with the present invention will be described below in detail with reference to the accompanying drawings.

Figure 5A:
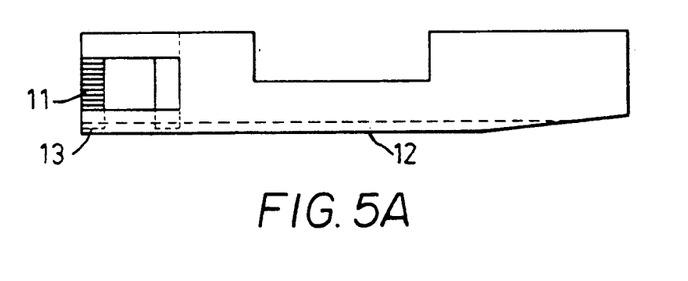
Figures 5B, 5C:
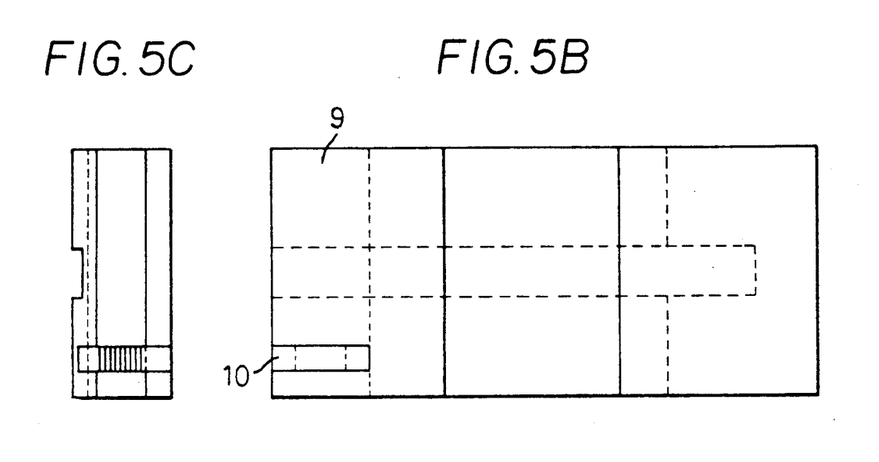

FIG. 5 shows a composite type magnetic head in accordance with an embodiment of the present invention. This magnetic head includes a ceramic slider and a core formed of a magnetic material and embedded in the slider. Components of this magnetic head identical or corresponding to those of the conventional magnetic head are indicated by the same reference characters.

The magnetic head of the present invention is a pneumatic floating type magnetic head suitable for use in a magneto-optical recording/reproduction apparatus constructed as a magnetic field modulation recording type shown in FIG. 2. This magnetic head is designed so as to float at a distance of about 10 μm from the surface of a magneto-optical disk, i.e., a recording carrier, by air flowing into the gap therebetween when the magneto-optical disk rotates.

Figure 6A:
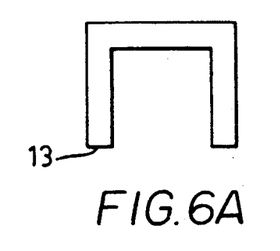
Figure 6B:
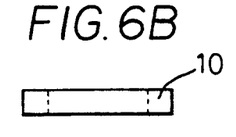
Figure 6C:
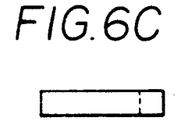

FIG. 6 shows the shape of the magnetic material core embedded in the slider 9. The end surface 13 of the core (hereinafter referred to as the "core end surface 13") facing the recording carrier has a 0.2×0.2 mm shape.

Referring back to FIG. 5, the core is embedded so that the core end surface 13 is located inside the slider at a distance of 35 μm from the pneumatic floating surface 12.

Figure 7:
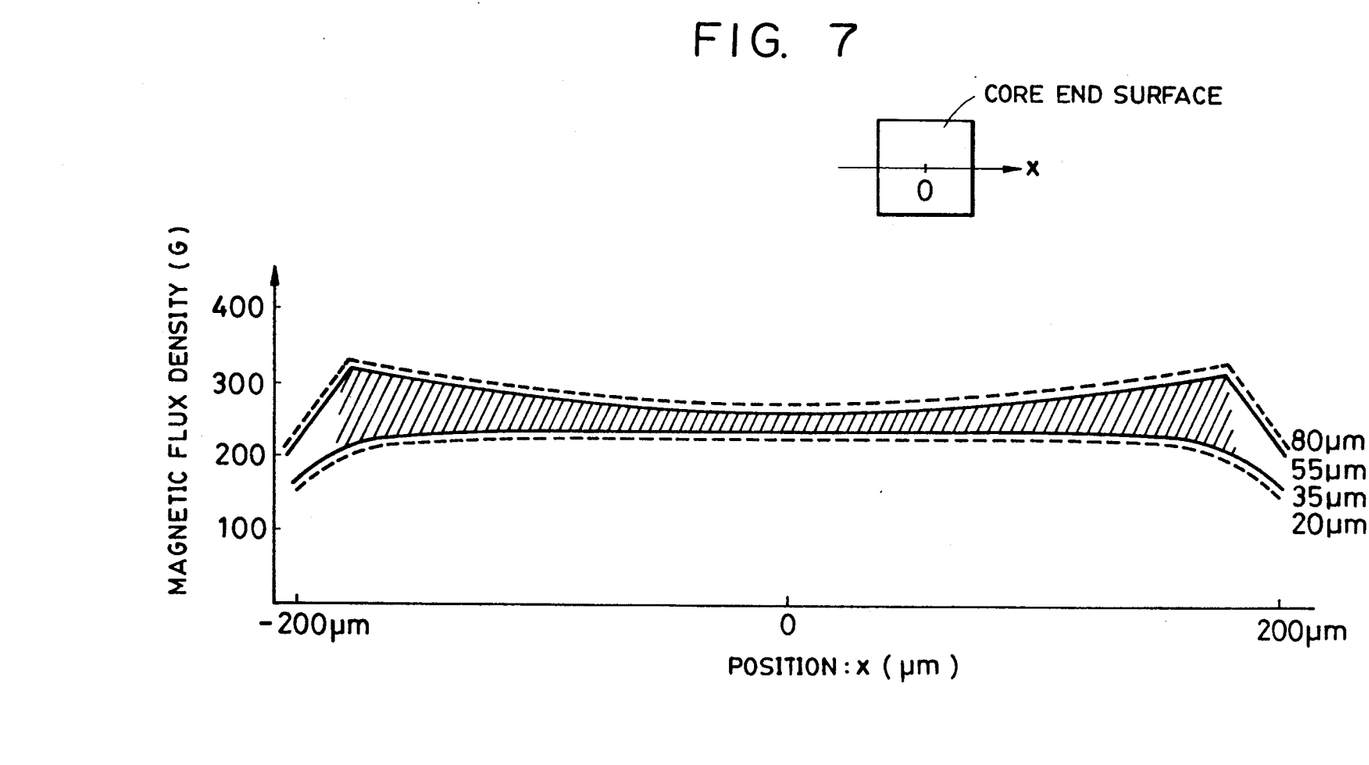
FIG. 7 is a diagram of distributions of a magnetic field applied to the recording layer by using the magnetic head shown in FIG. 5.

FIG. 7 shows the magnetic field distributions when the extent of floating of the pneumatic floating type magnetic head varies between 0 and 20 μm owing to the instability of the attitude of the magnetic head. This distribution was measured by winding a coil around the core and by causing a 6 AT (ampere turn) flow through the coil. The ordinate represents the magnetic flux density in Gauss, and the abscissa represents the position in μm with respect to the center 0 of the core end surface. In FIG. 7, magnetic field distributions are shown with respect to the distance between the core end surface 13 and the recording layer of the recording carrier ranging between 35 and 55 μm.

When the extent of the floating of the magnetic head ranges from 0 to 20 μm, the distance between the core end surface and the recording layer is 35 to 55 μm. At this time, the magnetic field varies as indicated by the hatched portion of FIG. 7. As is apparent therefrom, the density of the magnetic flux applied to the recording layer is within the range of 200 to 300 G at any position.

Distributions indicated by the broken lines are exhibited with respect to the following two distances between the core end surface and the recording layer: 20 and 80 μm. It is thereby determined that the magnetic flux density is within the range of 190 to 320 G, i.e., about 250 G±25% with respect to the range of 20 to 80 μm. If a magnetic field non-uniformity of ±25% relative to the central magnetic field is allowable in the case of the magnetic head of this embodiment having a 0.2×0.2 core, the distance d between the core end surface and the recording layer may be within the range of 0.1×(0.2 mm)=20 μm to 0.4×(0.2 mm)=80 μm, i.e., 20 μm<d<80 μm. That is, in a magnetic recording apparatus which includes a magnetic head having a core with a size of A×B (A≧B) in cross section that is formed of a magnetic material and which records information by applying a magnetic field to a recording carrier with this magnetic head, the distance d between the surface of the core facing the information recording carrier and the recording layer of the recording carrier is selected so as to satisfy the relationship:

$$0.1 \times B < d < 0.4 \times A.$$

The magnetic field applied to the recording layer facing the core end surface is thereby made uniform.

According to the present invention, the size of a core section is defined as A×B (A≧B), the core section being parallel to the recording surface of the recording carrier. Ordinarily, the core end surface facing the recording carrier has a surface parallel to the recording surface of the recording carrier. Also, according to the present invention, while the size of the core section is defined as A×B (A≧B), it is diameter×diameter if the core section is circular, major axis×minor axis if the core section is elliptical, side×side if the core section is square, or major side×minor side if the core section is rectangular.

As described above, it is possible to obtain a uniform magnetic field by maintaining the distance between the core end surface and the recording layer in a suitable range.

In the above-described embodiment, the surface of the core facing the recording carrier is embedded in the magnetic head by being recessed relative to the outer surface of the magnetic head facing the recording carrier so that the desired distance between the core surface facing the recording carrier and the recording layer of the recording carrier is maintained.

Figure 8:
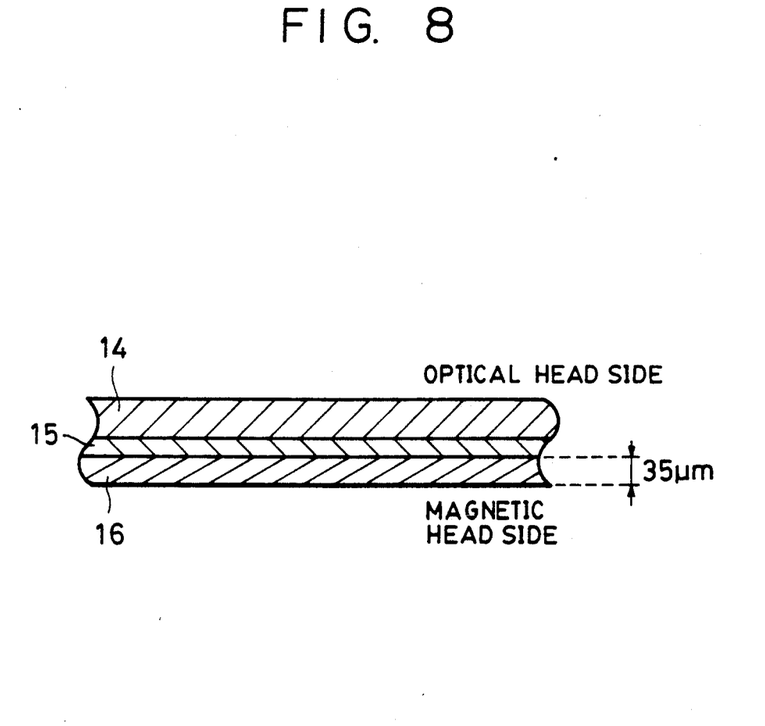
FIG. 8 is a schematic diagram of a recording carrier with a protective layer in accordance with the present invention.

An example of a method of maintaining the distance by embedding the core in the slider has been described in the above embodiment, but the present invention also can be applied to a magnetic head such as that described above with reference to FIG. 7, or to a magnetic head whose thickness is not large enough to embed the core. In such a case, a recording carrier such as that shown in section in FIG. 8 is used. A recording layer 15 is formed under a base 14, and a protective layer 16 is also formed under the recording layer 15. The desired distance between the recording layer and the core end surface is thereby maintained, and the same effect as that of the above-described embodiment can be obtained.

The thickness of such a protective layer formed on the recording layer is selected as described below. In a magnetic recording apparatus which includes a magnetic head with a core a size of A×B (A≧B) in cross section that is formed of a magnetic material and which records information by applying a magnetic field to a recording carrier with this magnetic head, if the distance between the recording carrier surface and the core surface facing the recording carrier is d', magnetic recording is performed by using a recording carrier in which a protective layer has a thickness D:

$$0.1 \times B - d' < D < 0.4 \times A - d'$$

formed on the recording layer. A uniform magnetic field thereby can be applied to the recording layer.

The present invention has been described with respect to pneumatic floating type magnetic heads. However, the present invention also is effective in applying a uniform magnetic field to the recording layer even in a case where a sliding type magnetic head, used by being slid on the recording carrier, is employed. In this case, as well, the core is embedded in the magnetic head or a protective film having a suitable thickness is formed on the recording carrier to maintain the desired distance between the recording layer of the recording carrier and the core end surface.

Also, in a case wherein a position control type magnetic head, i.e., a magnetic head fixed on the apparatus and wherein the distance between the magnetic head and the recording carrier is controlled (by an optical measuring means, e.g., a photointerrupter), the magnetic field generated by the magnetic head can be effectively utilized by setting the relationship between the core section size and the distance between the core end surface and the recording carrier in accordance with the present invention.

Further, in the case of a conventional magneto-optical recording and/or reproduction apparatus which does not effect overwriting, if a smaller bias magnet is brought closer to the recording carrier due to the reduction in the bias magnet size and, hence, a corresponding reduction in power consumption, the core section size and the range of the distance between the core end surface and the recording layer may be selected in the same manner as in the above-described embodiment, in accordance with the relationship specified by the present invention. It is thereby possible to effectively utilize the generated magnetic field.

In accordance with the present invention, as described above, if the size of the core end surface of the magnetic head is A×B (A≧B), the distance d between the recording layer of the recording carrier and the core end surface is selected so as to satisfy the relationship:

$$0.1 \times B < d < 0.4 \times A.$$

This arrangement is effective in making uniform the magnetic field applied to the recording layer facing the core end surface.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims, The scope of the following claims is to be accorded the broadest interpretation so as to encompass all such modification and equivalent structures and functions.

What is claimed is:

1. An apparatus for applying a magnetic field to a magnetic recording carrier, said apparatus comprising:
    a magnetic head for applying the magnetic field to the recording carrier, said magnetic head comprising a magnetic field generating core,
    wherein when the size of a cross section of said magnetic field generating core of said magnetic head is $A \times B$ ($A \geq B$), and when the distance between a surface of said core facing the recording carrier and a recording layer of the recording carrier is d, a relationship:

$$0.1 \times B < d < 0.4 \times A$$

is satisfied.

2. An apparatus according to claim 1, wherein the surface of said core facing the recording carrier is embedded in said magnetic head.

3. An apparatus according to claim 1, wherein said magnetic head comprises a pneumatic floating type magnetic head.

4. A magnetic recording apparatus comprising:
    a magnetic recording carrier; and
    a magnetic head for applying a magnetic field to said recording carrier to record information thereon, said magnetic head comprising a magnetic field generating core,
    wherein when the size of a cross section of a magnetic field generating core of said magnetic head is $A \times B$ ($A \geq B$), and when the distance between a surface of said core facing said recording carrier and a recording layer of said recording carrier is d, a relationship:

$$0.1 \times B < d < 0.4 \times A$$

is satisfied.

5. An apparatus for applying a magnetic field to a magneto-optical recording carrier, said apparatus comprising:
    an optical head for irradiating the magneto-optical recording carrier with a beam of light; and
    a magnetic head for applying a magnetic field to the recording carrier, said magnetic head comprising a magnetic field generating core,
    wherein when the size of a cross section of a magnetic field generating core of said magnetic head is $A \times B$ ($A \geq B$), and when the distance between a surface of said core facing the recording carrier and a recording layer of the recording carrier is d, a relationship:

$$0.1 \times B < d < 0.4 \times A$$

is satisfied.

6. A magneto-optical recording apparatus comprising:
    a magneto-optical recording carrier;
    an optical head for irradiating said magneto-optical recording carrier with a light beam; and
    a magnetic head for applying a magnetic field to said recording carrier simultaneously with the light beam irradiated by said optical head to record information on the recording carrier, said magnetic head comprising a magnetic field generating core,
    wherein when the size of a cross section of a magnetic field generating core of said magnetic head is $A \times B$ ($A \geq B$), and when the distance between a surface of said core facing the recording carrier and a recording layer of said recording carrier is d, a relationship:

$$0.1 \times B < d < 0.4 \times A$$

is satisfied.

7. A method of applying a magnetic field to a magnetic recording carrier having a recording layer, said method comprising the step of:
    applying a magnetic field to the recording medium by using a magnetic head including a magnetic field generating core having a size of $A \times B$ ($A \geq B$) in cross section; and
    satisfying a relationship:

$$0.1 \times B < d < 0.4 \times A$$

where d is the distance between a surface of the core facing the recording carrier and the recording layer of the recording carrier.

* * * * *

UNITED STATES PATENT AND TRADEMARK OFFICE
CERTIFICATE OF CORRECTION

PATENT NO. : 5,161,132

DATED : November 3, 1992

INVENTOR(S) : Makoto Hiramatsu

It is certified that error appears in the above-identified patent and that said Letters Patent is hereby corrected as shown below:

COLUMN 1

Line 8, "BACKGROUND OF THE INVENTION" should be centered as a heading.

COLUMN 2

Line 13, "FIG. 3 shows" should read --FIGS. 3A through 3C show--;
    Line 14, "A" should read --As shown in FIG. 3A, a-- and "core 10" should read --core 10 (Fig. 3B)--;
    Line 21, "for" should read --from--; and
    Line 62, "HE" should read --THE--.

COLUMN 3

Line 1, "fi" should read --if--;
    Line 2, "distanced" should read --distance of--;
    Line 3, "player" should read --layer--;
    Line 15, "be" should read --be a--;
    Line 21, "f" should read --of--; and
    Line 30, "magneto" should read --magneto- --.

UNITED STATES PATENT AND TRADEMARK OFFICE
CERTIFICATE OF CORRECTION

PATENT NO. : 5,161,132

DATED : November 3, 1992

INVENTOR(S) : Makoto Hiramatsu

It is certified that error appears in the above-identified patent and that said Letters Patent is hereby corrected as shown below:

COLUMN 4

Line 21, "3(A-C)" should read --3A through 3C-- and "diagram" should read --diagrams--;
    Line 28, "5(A-C)" should read --5A through 5C-- and "a schematic diagram" should read --schematic diagrams--;
    Line 31, "6(A-C)" should read --6A through 6C-- and "a" should be deleted;
    Line 47, "FIG. 5 shows" should read --FIGS. 5A through 5C show--;
    Line 49, "slider" should read --slider 9 (Fig. 5B)--;
    Line 63, "FIG. 6 shows" should read --FIGS. 6A through 6C show--;
    Line 64, "surface 13" should read --surface 13 (Fig. 6A)--; and
    Line 67, "FIG. 5," should read --FIGS. 5A through 5C,--.

COLUMN 7

Line 16, "claims," should read --claims.--; and
    Line 19, "ification" should read --ifications--.

Signed and Sealed this

Sixteenth Day of November, 1993

BRUCE LEHMAN

*Attest:*

*Attesting Officer*     *Commissioner of Patents and Trademarks*